US008825107B2

(12) United States Patent
Khasnabish

(10) Patent No.: US 8,825,107 B2
(45) Date of Patent: Sep. 2, 2014

(54) METHOD AND SYSTEM FOR TOLL-FREE GOVERNMENT PRIORITY TELECOMMUNICATION SYSTEMS

(75) Inventor: Bhumip Khasnabish, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1520 days.

(21) Appl. No.: 11/933,623

(22) Filed: Nov. 1, 2007

(65) Prior Publication Data

US 2008/0267376 A1 Oct. 30, 2008

Related U.S. Application Data

(60) Provisional application No. 60/913,571, filed on Apr. 24, 2007.

(51) Int. Cl.
*H04B 7/00* (2006.01)
*H04M 3/42* (2006.01)
*H04M 3/36* (2006.01)

(52) U.S. Cl.
CPC ...... *H04M 3/42187* (2013.01); *H04M 2242/06* (2013.01); *H04M 3/367* (2013.01); *H04M 2242/04* (2013.01)
USPC ...................... 455/527; 455/512; 379/208.01

(58) Field of Classification Search
USPC .................. 379/243, 201.01, 212.01, 207.02, 379/208.01, 209.01; 370/352, 401; 455/404.1, 445, 509, 512, 527
See application file for complete search history.

(56) References Cited

U.S. PATENT DOCUMENTS

| 5,430,782 | A | * | 7/1995 | Brady et al. ............. 379/221.14 |
| 6,069,882 | A | * | 5/2000 | Zellner et al. ................. 370/329 |
| 6,356,622 | B1 | * | 3/2002 | Hassell et al. ............... 379/1.01 |
| 8,045,973 | B2 | * | 10/2011 | Chambers .................. 455/422.1 |
| 2002/0098825 | A1 | * | 7/2002 | Struhsaker .................... 455/404 |
| 2004/0114611 | A1 | * | 6/2004 | O'Connell et al. ........... 370/401 |
| 2004/0203563 | A1 | * | 10/2004 | Menard ...................... 455/404.1 |
| 2005/0070230 | A1 | * | 3/2005 | Das et al. ........................ 455/69 |
| 2005/0227666 | A1 | * | 10/2005 | Cheng ........................ 455/404.1 |
| 2006/0140384 | A1 | * | 6/2006 | Plunkett et al. .......... 379/221.02 |
| 2007/0041545 | A1 | * | 2/2007 | Gainsboro .................... 379/188 |
| 2007/0115935 | A1 | * | 5/2007 | Qiu et al. ...................... 370/352 |
| 2007/0149203 | A1 | * | 6/2007 | Sliva ............................ 455/445 |
| 2008/0010674 | A1 | * | 1/2008 | Lee ................................... 726/7 |
| 2008/0123821 | A1 | * | 5/2008 | Goldman et al. .............. 379/45 |
| 2008/0192921 | A1 | * | 8/2008 | Goldman et al. ............ 379/243 |

OTHER PUBLICATIONS

Chambers, M. D. and Riley, D. H. (2004), Implementing wireless priority service for CDMA networks. Bell Labs Technical Journal, 9: 23-36. doi: 10.1002/bltj.20023.*
F. Baker, et al "Implementing an Emergency Telecommunications Service for Real Time Services in the Internet Protocol Suite", IETF Internet Draft (ID), draft-ietf-tsvwg-mlpp-that-works-04, Feb. 27, 2006, pp. 1-45.*
("GETS Government Emergency Telecommunications Service" Information from the U.S. Department of Homeland Security (4 pages), Jan. 7, 2005.*

* cited by examiner

*Primary Examiner* — Duc Nguyen
*Assistant Examiner* — Kile Blair

(57) ABSTRACT

A method of an embodiment may include receiving a request for a toll free priority call from a caller, verifying authorization of a caller for priority service, translating a caller provided number to a routable destination number, and routing the toll free priority call with priority to the routable destination number.

21 Claims, 2 Drawing Sheets

A METHOD AND SYSTEM FOR TOLL-FREE GOVERNMENT PRIORITY TELECOMMUNICATION SYSTEMS

CROSS-REFERENCE TO RELATED APPLICATIONS

This patent application claims priority to U.S. Provisional Patent Application No. 60/913,571, filed Apr. 24, 2007, which is hereby incorporated by reference herein in its entirety.

BACKGROUND INFORMATION

Government Emergency Telecommunications Service (GETS) priority calls in the operational circuit switched Public Switched Telephony Network (PSTN) cannot be placed to toll-free numbers. Toll-free numbers include numbers beginning with "800", "888", "877" and other area codes or numbers for which the called party pays for the call charges. Wireless Priority Service (WPS) calls can also not be placed to toll-free numbers. Enabling callers to place priority calls over GETS and WPS to toll-free numbers can be useful in various contexts (e.g., in Department of Homeland Security, or DHS, and/or National Communications System, or NCS, operations/applications). Consequently, there is a need for toll-free calling capability in the context of GETS and WPS.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Exemplary embodiments of the present invention provide a toll free government priority calling system. The toll free government priority calling system may enable a user of Government Emergency Telecommunications Service (GETS) or users of Wireless Priority Service (WPS) to place priority calls to toll-free numbers.

Figure 1:
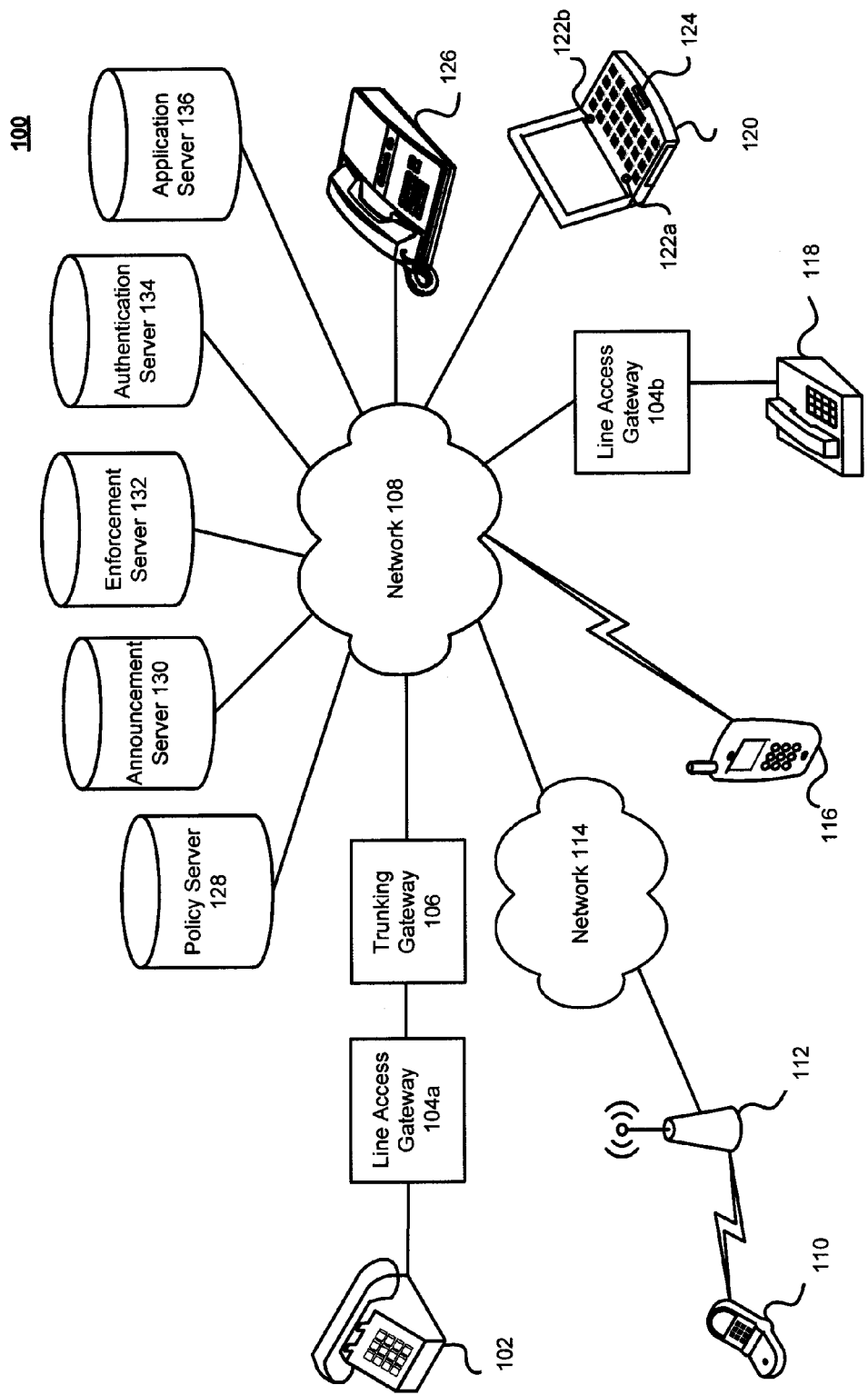
FIG. 1 is a toll free government priority calling system, in accordance with an exemplary embodiment.

Referring to FIG. 1, a toll free government priority calling system in accordance with an exemplary embodiment is illustrated. System 100 illustrates an exemplary system toll free government priority calling. It is noted that System 100 is a simplified view of a network and may include additional elements that are not depicted. As illustrated, phone 102 may be a Plain Old Telephone Service (POTS) based phone. Phone 102 may be communicatively coupled to line access gateway 104a. Line access gateways 104a and 104b may facilitate the use of POTS based equipment such as phones, fax machines, modems and other devices over networks, such as an Internet Protocol (IP) based network. Line access gateway 104a may be communicatively coupled to trunking gateway 106. Trunking gateway 106 may be a private branch exchange (PBX) or a private telephone exchange which may connect to one or more networks and may provide phone service for a private organization such as a company. Trunking gateway 106 may be communicatively coupled to network 108. Network 108 may be a local area network (LAN), a wide area network (WAN), the Internet, a cellular network, a satellite network or other networks that allow the transmission and/or reception of data to and/or from phone 102. Mobile phone 110 may be a mobile phone, a cellular phone or a satellite phone and may be connected to receiver 112. Receiver 112 may be a receiver on a cellular network, a wireless access point on a wireless network or another receiver capable to transmitting to and receiving from mobile phone 110. Receiver 112 may be communicatively coupled to network 114. Network 114 may be a local area network (LAN), a wide area network (WAN), the Internet, a cellular network, a satellite network or other networks that allow the transmission and/or reception of data to and/or from mobile phone 110. Network 114 may be communicatively coupled to network 108. Mobile device 116 may also be communicatively coupled to network 108. Mobile device 116 may be a cellular phone, a mobile phone, a satellite phone, a smart phone, a Personal Digital Assistant (PDA), a computer, or other devices capable of receiving and transmitting data related to requests for priority telecommunications service. Phone 118 may be a Plain Old Telephone Service (POTS) phone communicatively coupled to network 108 through line access gateway 104b. Computer 120 may be communicatively coupled to network 108 and may utilize speakers 122a and 122b and a microphone 124 to enable phone calls. Phone 126 may be communicatively coupled to network 108 and may be capable of handling Voice over IP based communications, Session Initiation Protocol communications or other network communication protocols. One or more additional network elements may be communicatively coupled to network 108.

The various components of system 100 as shown in FIG. 1 may be further duplicated, combined and/or integrated to support various applications and platforms. Additional elements may also be implemented in the systems described above to support various applications.

Policy server 128 may facilitate routing and other aspects of priority call requests. Application Server 136 may facilitate translation of user provided numbers into routable destination numbers. Authentication server 134 may facilitate authentication of users requesting priority calls. Enforcement server 132 may facilitate the acquisition of bandwidth for priority calls. Announcement server 130 may provide audio prompts, messages and information to one or more callers.

In one or more embodiments, network 108 may utilize one or more protocols of clients or communicatively coupled devices, including phone 126, computer 120, mobile device 116, line access gateways 104a and 104b, network 114 and other devices capable of network communication. Network 108 may translate to or from other protocols to one or more protocols of communicatively coupled devices, networks and network elements such as mobile device 116 and network 114. Data may be transmitted and/or received utilizing a standard telecommunications protocol or a standard networking protocol. For example, one embodiment may utilize Session Initiation Protocol (SIP). In other embodiments, the data may be transmitted and/or received utilizing Voice Over IP (VoIP) protocols or other Transmission Control Protocol/Internet (TCP/IP) Protocols. For example, call data may also be transmitted and/or received using Wireless Application Protocol (WAP), Global System for Mobile communications (GSM), or other protocols suitable for transmitting and receiving call data. Data may be transmitted and/or received wirelessly or may utilize cabled network or telecommunication connections such as an Ethernet RJ45/Category 5 Ethernet connection, a fiber connection, a traditional phone wireline connection, a cable connection or other wired network connection. Network 108 may use standard wireless protocols including IEEE 802.11a, 802.11b and 802.11g. Network 108 may also be connected to Network 114 via protocols for a wired connection, such as an IEEE Ethernet 802.3. One or more network elements may be connected to networks 108 and 114.

Network elements may provide application programming interfaces (APIs), interface tables, remote procedure calls (RPCs), web services, Extensible Markup Language (XML) based interfaces, Simple Object Access Protocol (SOAP) based interfaces, Common Object Request Broker Architecture (CORBA) based interfaces and other interfaces for sending or receiving call information. Network elements such as policy server 128, announcement server 130, enforcement server 132, authentication server 134, and application server 136 may be one or more servers (or server-like devices), such as a Session Initiation Protocol (SIP) server. Network elements may include one or more processors (not shown) for recording, transmitting, receiving, and/or storing data. Although network elements are depicted as individual servers, it should be appreciated that the contents of each network element may be combined into fewer or greater numbers of servers (or server-like devices) and may be connected to one or more data storage systems or databases. For example, policy server 128 may be connected to one or more application servers 136. Furthermore, the server may be local, remote, or a combination thereof to policy server 128. Additionally, one or more network elements may be combined and may be implemented on a single platform. The selection of network elements may be done in a fixed manner or it may be done intelligently. A network element managing a call request or another request for network services may intelligently select one or more additional network elements to facilitate the handling and provision of the network service. The selection of one or more additional network elements by a first network element may be made according to pre-specified criteria, such as, available bandwidth, utilization of a network element, network service type requested, a location of a routable destination number, or other network or call related factors. For example, policy server 128 may choose one or more enforcement servers 132 according to a pre-specified condition providing that an enforcement server 132 associated with the most available bandwidth should be utilized first.

Policy server 128, may be a Session Initiation Protocol (SIP) server, an application server, a web services service broker, a parlay gateway or other network element capable of receiving a request for a priority call. Policy server 128 may receive data from a user device and may prompt a user for information such as a Personal Identification Number (PIN) or other identification or authorization information. Policy server 128 may also prompt a user for routing information such as a destination number. Policy server 128 may set the priority of a call, network connection, and/or other transmission. For example, policy server 128 may indicate that a call is a priority call to be given bandwidth ahead of or even in place of non-priority calls. By way of non-limiting example, policy server 128 may do this by setting a Session Initiation Protocol (SIP) Resource Priority Header (RPH) to indicate that a call is a priority call. Policy server 128 may utilize protocol header fields or other indicators to communicate the status of a transmission. Calls may be routed by policy server 128. For example, a call may be routed to a destination number representing the party or network address desired by a caller. Additionally, if a network is congested, a call may be routed via an alternative network, such as a government private network, a military controlled network, a satellite network, a cellular network or other network capable of routing a call. Policy server 128 may request services from other network elements, such as enforcement server 132, authentication server 134, application server 136, and announcement server 130. Services may be requested using web services or other Application Programming Interfaces (APIs) or interfaces of the other network elements. In some embodiments, policy server 128 may redirect a call to an announcement server, such as announcement server 130.

In one or more embodiments, announcement server 130 may be a Session Initiation Protocol (SIP) server, an application server, a web services service broker, a parlay gateway or other network element capable of providing audio information to one or more callers. Announcement server 130 may prompt callers for information. Announcement server 130 may provide alerts, error messages, help, waiting time information, call termination warnings and other information. Announcement server 130 may play a specified announcement to a call directed to the announcement server. In an exemplary embodiment, announcement server 130 may provide a customized announcement based on the identity of the intended call recipient, the identity of the caller, the caller's authorization status or other attribute associated with the caller and/or client device. For example, an announcement may be customized to contain information related to the status of network traffic to a destination number. In other embodiments, an announcement may be synthesized based on call information such as the time before termination of non-priority call, the estimate hold time before connection of a priority call waiting in a queue, authorization errors or other messages. Announcement server 130 may provide announcement services for one or more network entities including policy server 128 and enforcement server 132.

In some embodiments, enforcement server 132 may be a Session Initiation Protocol (SIP) server, an application server, a web services service broker, a parlay gateway or other network element capable of enforcing bandwidth and prioritization rules on one or more networks. For example, enforcement server 132 may assist policy server 128 in ensuring that priority calls are connected. Enforcement server 132 may verify available network bandwidth on one or more networks for a desired network connection or communication. Enforcement server 132 may determine statistics and information about one or more networks including: a total number of current calls, a total number of queued calls, a number of priority calls, a number of non-priority calls, an average hold or queue time, the duration time of one or more calls, the origination and/or destination endpoints of one or more calls and other communication, connection or call information. Enforcement server 132 may terminate a non-priority call to provide bandwidth for a priority call. Calls may be terminated based on a variety of statistics, rules or other information. For example, a non-priority call may be terminated based on the call duration, call destination, call origination or other information. Non-priority calls may also be terminated in a random order or based on specified rules. Additionally, non-priority calls may be redirected to an announcement server to inform one or more callers that the call is going to be terminated at a specified time. Enforcement server 132 may ensure that priority calls are queued for available bandwidth ahead of non-priority calls. Alternatively, enforcement server 132 may ensure that non-priority calls are not queued but are redirected to an announcement server or are dropped. In one or more embodiments, enforcement server 132 may route priority calls via alternative networks if a current network is congested.

Authentication server 134 may be a Session Initiation Protocol (SIP) server, an application server, a web services service broker, a parlay gateway or other network element capable of receiving authentication data, verifying one or more caller identities and/or authorizing a call to be routed as a priority call. For example, authentication server 134 may receive a PIN, password, code or other identifier that may identify a caller. Authentication server 134 may query one or more databases to verify the identity of a caller utilizing the PIN or other identifier. Authentication server 134 may also query one or more databases to determine network conditions, to determine authorization rules, or to gather other information relevant to authentication and/or authorization of one or more callers. Authentication server 134 may then authenticate the caller to place a priority call based in part on the results of the query, pre-specified rules for caller authorization, data regarding current network conditions, or other relevant authorization data. Authentication server 134 may identify a caller based on caller provided information, such as a Personal Identification Number (PIN), and may not rely on caller identification, Automatic Number Identification (ANI), Dialed Number Identification Service (DNIS) or other telephony services indicating a location of a caller, a name of a caller or a phone number of a caller. Verification by a Personal Identification Number (PIN) or other location independent or calling number independent identifier may enable a caller to access priority phone service regardless of their location. For example, a member of The Department of Homeland Security may respond to a terrorist attack while he is at a store, a hotel, or not within a cell phone coverage area by dialing a priority service access number from a payphone and entering a Personal Identification Number for authorization. This may enable a user of a priority service to place a priority call in the event that the user is does not have access to a number that may be recognized as a priority number. In one or more embodiments, authentication server 134 may utilize caller identification, Automatic Number Identification (ANI), Dialed Number Identification Service (DNIS) or other telephony services indicating a location of a caller or a phone number of a caller. In one or more embodiments utilizing telephony services to provide identification of a caller utilizing an originating number, authentication server 134 may authenticate a user based on information provided by the telephony service and may not require a user to provide authentication information. For example, a call made from a phone that is part of a dedicated hotline at a government agency may be identified by Automatic Number Identification (ANI) and may be authenticated by authentication server 134 without requiring user input of authentication information. Additionally, authentication server 134 may use information provided by the telephony service as well as authentication information provided by a user for authentication. In some embodiments, authentication server 134 may set an indicator on a call header or portion of the connection to ensure the call receives priority treatment. Authentication server 134 may also deny a caller authorization or take other appropriate call handling action, such as: transferring a call to an announcement server to provide further information, transferring a call to an operator, and/or routing a call without priority. Alternatively, authentication server 134 may transmit information regarding a caller's identity, authorization, or other call related information to a second network entity via an Application Programming Interface (API) or other interface. A second network entity may then handle setting a call status as priority, denying a call priority status, providing an error message or error handling, or taking another appropriate call handling action.

Application server 136 may be a Session Initiation Protocol (SIP) server, an application server, a web services service broker, a parlay gateway or other network element capable of receiving a number entered by a caller corresponding to a toll-free number and translating the entered number into a routable destination number. Application server 136 may receive a toll-free number dialed, entered, spoken or otherwise inputted by a caller. The toll-free number may be forwarded to the application server 136 from another network entity. Application server 136 may query one or more databases using the received toll-free number and may retrieve one or more routable destination addresses corresponding to the toll-free number. In some embodiments, the routable destination addresses may correspond to phone numbers with area codes which are not toll free area codes and which are routable over a Public Switched Telephone Network (PSTN). Application server 136 may choose a destination number based in part on a call origination location, destination number location, time of day, day of week, day of year, network congestion, customer rules or other call related factors. Application server 136 may facilitate the routing of a call to the destination number or may return the destination number to one or more network elements for routing.

Network elements such as policy server 128, announcement server 130, enforcement server 132, authentication server 134, and application server 136 may be communicatively coupled to network 108 which may be a circuit switched network, a packet based network, a cellular network, a wireless network, a Public Switched Telephone Network (PSTN) or another wireline network. One or more network elements communicatively coupled to wireline networks may facilitate or support the Government Emergency Telecommunications Service (GETS). Additionally, one or more network elements communicatively coupled to wireline networks may facilitate priority service for calls going to destination numbers on wireless or cellular networks and may support nationwide Wireless Priority Service (WPS). Furthermore, one or more network elements communicatively coupled to a wireline network may facilitate Government Emergency Telecommunications Service (GETS) priority calls or other priority calls for one or more calls received from a wireless network communicatively coupled to the wireline network on which the network elements are located. One or more network elements may be connected to one or more wireless or cellular networks and may facilitate priority service for toll free callers over a wireless or cellular network. Priority service over wireless or cellular networks may support the nationwide Wireless Priority Service (WPS). One or more network elements connected to a wireless network may support priority service or WPS service for calls received from one or more communicatively coupled wireline networks or for calls transmitted to one or more communicatively coupled wireline networks. Network elements may be duplicated with priority service for a wireless network handled by one or more network elements on the wireless network and priority service on a wireline network handled by one or more network elements on the wireline network. Alternatively, one or more network elements may handle portions of prioritization service on communicatively coupled wireline and wireless networks regardless of the type of network on which the network element resides. Priority service requested by a caller for a call transitioning from a wireless to wireline network or vice-versa may be enabled for only the wireless portion of the call, for the wireline portion of the call and/or multiple segments of the call regardless of whether the segment is across a wireless or wireline network. For example, returning to FIG. 1, a user of mobile phone 110 may connect to network 114 which may be a wireless network. The user may connect via receiver 112 which may be a base station on the wireless network. The user may request priority service and may enter a toll-free number which may translate to a number corresponding to phone 126. Network 108 may, in this example, be a wireline network, such as a Public Switched Telephone Network (PSTN). The call may receive one or more call handling, authentication and verification services from one or more network elements communicatively coupled to network 108. The may also receive one or more call handling, authentication and verification services from one or more network elements (not shown) communicatively coupled to network 114. The call may receive priority service from receiver 112 through network 114 which may correspond to Wireless Priority Service (WPS). The call may receive priority service across network 108 to phone 126, which may correspond to Government Emergency Telecommunications Service (GETS). In some embodiments, the call may receive priority across both networks.

In some embodiments, network 108 may be a Voice Over IP (VoIP) network and may support priority calls for one or more Voice Over IP (VoIP) devices that connect operatively to the network through wired or wireless connections. For example, mobile device 116 may be a voice over IP enabled device that may connect using Wireless Fidelity (WiFi), an IEEE 802.11 compliant standard or another wireless networking standard. Additionally, phone 126 may be a Voice Over IP (VoIP) enabled phone which may connect via a wired connection to network 108. Calls to and from mobile device 116 and/or phone 126 may be capable of placing or receiving priority calls.

Figure 2:
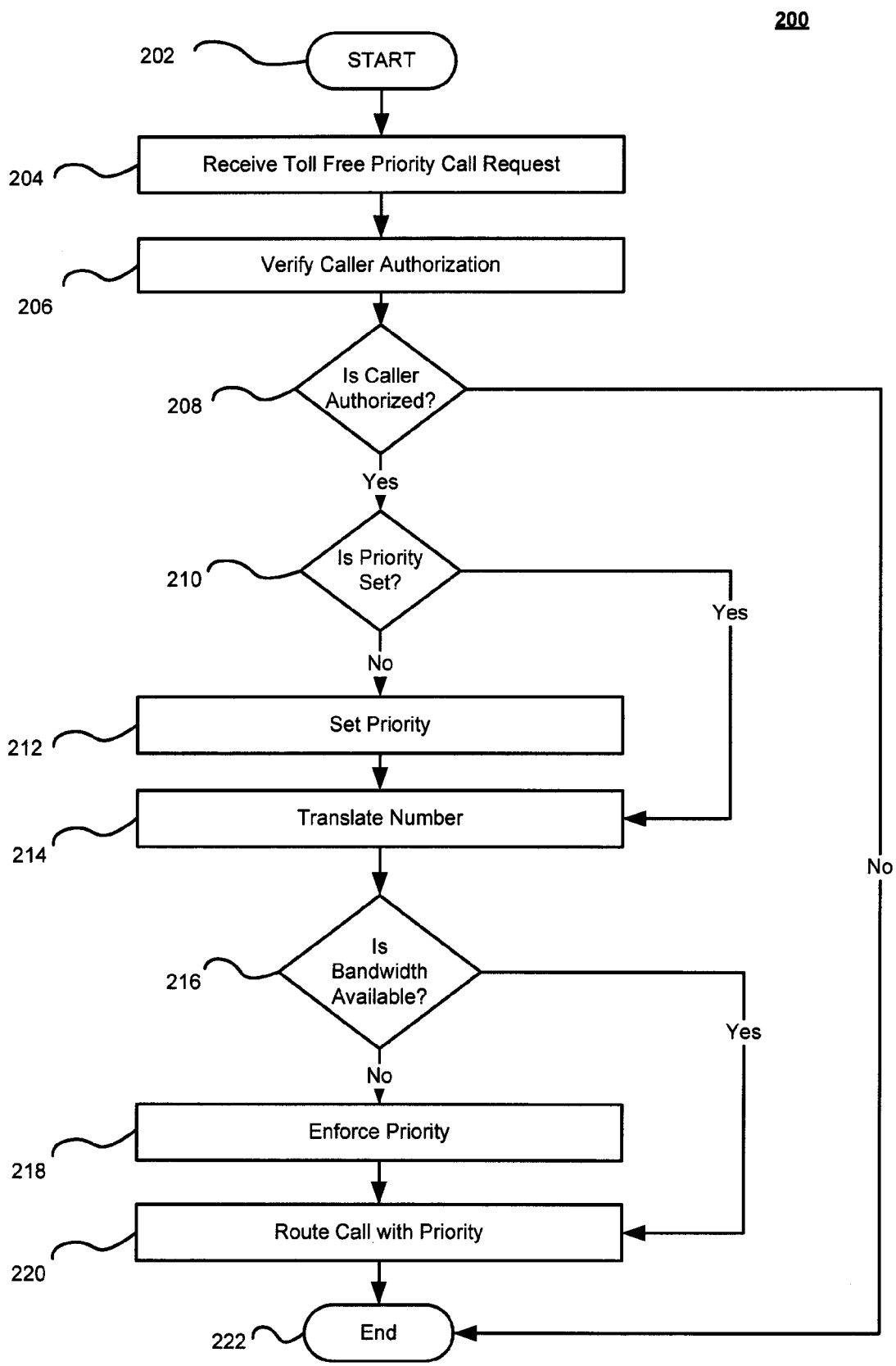
FIG. 2 depicts a method for implementing a toll free government priority calling system, in accordance with an exemplary embodiment.

FIG. 2 illustrates a flow diagram of a method 200 for implementing a toll free government priority calling system, in accordance with exemplary embodiment. This exemplary method 200 is provided by way of example, as there are a variety of ways to carry out the method. The method 200 shown in FIG. 2 can be executed or otherwise performed by one or a combination of various systems. The method 200 is described below may be carried out by the toll free government priority calling system 100 shown in FIG. 1 by way of example, and various elements of the detection system 100 are referenced in explaining the example method of FIG. 2. Each block shown in FIG. 2 represents one or more processes, methods or subroutines carried out in exemplary method 200. Referring to FIG. 2, exemplary method 200 may begin at block 202.

At block 204, a toll-free priority call request may be received. The call request may be received by one or more network elements and may be handled or may be routed to an appropriate network element for handling. For example, a toll-free call request may be received in network 108 and may be routed to policy server 128. Policy server 128 may prompt a caller for a Personal Identification Number (PIN) number or other identification information for authorization purposes. Prompting may be accomplished by policy server 128 or policy server 128 may utilize one or more services of announcement server 130 or other network elements. Once identification information has been received from a caller, policy server 128 may utilize the information for authentication.

In some embodiments, a call request may be initiated by a user of Government Emergency Telecommunications Service (GETS) or Wireless Priority Service (WPS). For example, a user of phone 102 may be an employee at a government agency desiring to make a priority call to a toll-free number during a crisis using a standard Plain Old Telephone System (POTS) phone. The user of phone 102 may dial an access number or other indicator to indicate that they are requesting priority. The request may trigger a message or other notification to policy server 128 via network 108.

At block 206, a caller may be authenticated. Policy server 128 may authenticate a user by querying one or more databases using obtained authentication information. Policy server 128 may route a call to authentication server 134 or may utilize one or more services, interfaces or Application Programming Interfaces (APIs) of authentication server 134. Authentication server 134 may query one or more databases using user provided authentication information, such as a Personal Identification Number (PIN) number. Authentication server 134 may authenticate a caller as a valid user of Government Emergency Telecommunications Service (GETS), Wireless Priority Service (WPS) or another priority calling system. A caller's authentication status and other information may be returned from authentication server 134 to one or more network elements, such as policy server 128, for call handling. In some embodiments, authentication server 134 may handle a call and may route the call or perform other call handling actions based on whether or not a caller is authenticated.

At block 208, the method may utilize the authentication status of a caller to authenticate the call. If the caller is not authenticated, the method may end at block 222. Unauthenticated callers may first receive an error message or may be transferred to announcement server 130 to receive an error message. An unauthenticated call may then be dropped or may receive further handling from one or more network elements. If the caller is authenticated the method may continue at block 210.

At block 210, the method may determine whether priority is set for the call. If priority is set, the method may continue at block 214, if priority is not set, the method may continue at block 212. One or more network elements may set priority for an authenticated call at block 212. For example, an authenticated call may be marked as a priority call by policy server 128. Policy server 128 may set priority on a call by marking a setting a flag or field value in a header, wrapper, overhead or meta information related to the call. In one or more embodiments, setting priority for a call on a Session Initiation Protocol (SIP) based network may be accomplished by setting a resource priority header on the call.

At block 214, a number may be translated from a toll-free number to a routable Plain Old Telephone System (POTS) number. For example, a caller may input a number with an area code of 800, 888, 877, 866 or other toll free area code. This number may not be routable to a destination number and may require translation to an area code and number which is not toll free. This may be done without affecting the toll free status of the call or the priority of the call (i.e., the called party may still pay the charges for the call and the call may still be routed with priority). The routable destination number may be determined based on the location of the caller, the location of the called party, network traffic and/or other call related conditions. Policy server 128 may translate one or more toll-free numbers to routable destination numbers. In some embodiments, policy server 128 may utilize one or more services of application server 136 to translate a toll-free number inputted by a user into a routable destination number. Application server 136 may query one or more databases to accomplish the number translation. Application server 136 may apply one or more rules when translating numbers. For example, a toll-free number provided by a caller may be routable to multiple destination numbers. Application server 136 may choose a destination number based on network traffic, caller location, called party location, or other routing rules. After a routable destination server is chosen, application server 136 may return the routable destination number to one or more network elements for further call handling. In some embodiments, application server 136 may perform further call handling. The method may continue at block 216.

At block 216, one or more network elements may determine the availability of bandwidth for a priority call. Bandwidth availability may be determined by policy server 128, by enforcement server 132 or by other network elements. One or more network elements may monitor network traffic statistics and may maintain network traffic information, network routing information and other network information in one or more databases. For example, policy server 128 may query a network call provisioning database and may receive information on network traffic relevant to the routing of a current priority call. Queries may be based on a called number, a routable destination number or other call related information. If sufficient bandwidth for a priority call is available the method may continue at block 220. If there is not sufficient bandwidth for the call, the method may continue at block 218.

At block 218, priority for a priority call may be enforced. In some embodiments, if there is insufficient bandwidth for a priority call, it may be placed in a queue ahead of non-priority calls for the next available bandwidth. Priority calls in a queue may be directed to an announcement server which may provide information on expected hold time, network conditions, instructions for a priority caller or other information. Priority may also be enforced by terminating non-priority calls and utilizing the bandwidth from the terminated call for the priority call. Enforcement server 132 may terminate one or more non-priority calls to ensure adequate bandwidth for one or more priority calls. Enforcement server 132 may terminate a non-priority call randomly or it may use various algorithms to determine the appropriate call to terminate. Calls may be terminated based on a duration of a call, a called party, a calling party, or other factors. Calls to be terminated may first be redirected to an announcement server, such as announcement server 130. Announcement server 130 may provide one or more participants in a call to be terminated with information, a warning that a call is to be terminated in a specified number of minutes or other information. If a call is redirected to announcement server 130, enforcement server 132 may wait the number of minutes specified in an announcement and may then determine if the call has terminated. If the non-priority call has been terminated by the callers, enforcement server 132 may reserve the bandwidth from the terminated call for the priority call. If the call to be terminated is still connected, enforcement server 132 may terminate the call. In some embodiments, prior to terminating a call, enforcement server 132 may make an additional check of available bandwidth and may not terminate the call if sufficient bandwidth for the priority call has become available. If sufficient bandwidth has become available this may be reserved for the priority call by the enforcement server. In the context of this example, a call to be terminated may be redirected to an announcement server to advise call participants that their call is no longer going to be terminated. In some embodiments, even if sufficient bandwidth has become available, a call may be terminated once a warning or an announcement related to the termination has been issued to participants of the call. Priority calls in a queue may be served using a variety of algorithms such as First In First Out (FIFO), levels of prioritization based on an identity of a user, the called number, or other call related attributes. Extra bandwidth beyond what is necessary to route the priority call may then be reserved for one or more priority calls. Enforcement server 132 may also reserve bandwidth for priority calls as it becomes available even if there are currently no priority calls in a queue. Enforcement server 132 may reserve additional bandwidth based on pre-specified rules, network statistics and other information. For example, enforcement server 132 may reserve bandwidth if network congestion is beyond a certain threshold and if a certain percentage of priority calls have been in a queue longer than a specified duration. Once bandwidth has been identified for a priority call, it may be routed.

At block 220, a priority call may be routed by one or more network elements. Policy server 128 may route a priority call using identified available bandwidth. Policy server 128 or enforcement server 132 may also route a priority call utilizing bandwidth from a terminated call or bandwidth reserved for priority calls by enforcement server 132. In one or more embodiments, enforcement server 220 may identify alternative network routes for priority calls if a current network is congested. Alternative network routes may include satellite networks, cellular networks, packet switched networks, circuit switched networks, military controlled networks or government private networks or other networks suitable for routing a priority call.

At block 222, method 200 may end.

Network elements may provide services in a variety of orders to accomplish method 200. For example, in some embodiments an enforcement server, such as enforcement server 132, or another network element, may check the availability of network bandwidth prior to the authentication of a user. In certain situations, bandwidth may not be available for priority calls and thus it may be more expedient to verify bandwidth prior to authentication. In one or more embodiments, an application server, such as application server 136, may be utilized initially to determine if a number provided by a caller may be mapped to a routable number. This may be done prior to the utilization of other services and/or other network elements. The order in which services are provided to a call may be fixed, random, round-robin or may vary according to network related criteria, call related criteria and/or pre-specified call handling rules. For example, priority calls may receive services from one or more network elements depending on the traffic to or utilization of one or more network elements. If a network element providing authentication is heavily utilized, a call may have a user provided number translated by a second network element prior to authentication and method 200 may thereby achieve a higher probability of call completion.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving a request for a priority call comprising a priority indicator and a phone number including a toll-free area code from a caller;
at least one computer processor verifying authorization of the caller for priority service;
the at least one computer processor translating the phone number including the toll-free area code provided by the caller to a routable destination number;
the at least one computer processor determining whether sufficient bandwidth is available for the priority call prior to routing the priority call;

identifying a current call to be terminated and a time when the current call will be terminated, in response to determining that insufficient bandwidth exists for the priority call;

when the time for terminating the current call is reached, the at least one computer processor again determining whether sufficient bandwidth is available for the priority call and performing at least one of: terminating the current call and using the bandwidth from the terminated call for the priority call in response to determining that sufficient bandwidth continues to be unavailable for the priority call, or continuing the current call and using the existing bandwidth for the priority call in response to determining that sufficient bandwidth now exists for the priority call; and the at least one computer processor routing the priority call to the routable destination number.

2. The method of claim 1 wherein the request for a priority call is a request for a priority call utilizing government emergency telecommunications services.

3. The method of claim 1 wherein the request for a priority call is a request for a priority call utilizing a wireless priority service.

4. The method of claim 1 wherein the priority call is identified as a priority call by setting a session initiation protocol resource priority header.

5. The method of claim 1 wherein terminating a current call is based at least in part on a duration of the current call.

6. The method of claim 1 wherein terminating a current call further comprises randomly choosing a call from a set of non-priority current calls.

7. The method of claim 1 further comprising the at least one computer processor redirecting a call to be terminated to an announcement server and providing information to one or more participants in the call to be terminated prior to termination.

8. The method of claim 1 further comprising the at least one computer processor routing the priority call through an alternative network in the event there is insufficient bandwidth available for the priority call in a current network.

9. The method of claim 8 wherein the alternative network comprises one of: a satellite network, a cellular network, or a packet switched network.

10. A non-transitory computer readable medium comprising code to perform the acts of the method of claim 1.

11. The method of claim 1 further comprising, the at least one computer processor:
enforcing priority if insufficient bandwidth is available for the priority call, prior to routing the priority call,
wherein enforcing priority includes performing at least one of the following actions on a non-priority call: terminating the non-priority call based on the non-priority call's duration, terminating the non-priority call based on the non-priority call's destination, terminating the non-priority call based on the non-priority call's origin, redirecting the non-priority call to an announcement server or queuing the non-priority call after the priority call.

12. The method of claim 1 further comprising:
the at least one computer processor redirecting the current call to an announcement server;
the announcement server providing information to one or more participants in the current call prior to termination, wherein the information includes the time when the current call will be terminated; and
the announcement server informing the one or more participants in the current call that the current call will not be terminated, in response to determining that sufficient bandwidth now exists for the priority call.

13. A system, comprising:
one or more network elements communicatively coupled to a network wherein the one or more network elements are configured to:
receive a request for a priority call comprising a priority indicator and a phone number including a toll-free area code from a caller;
authenticate the caller and approve the priority call;
translate the phone number with the toll-free area code provided by the caller to a routable destination number;
determine whether sufficient bandwidth is available for the priority call prior to routing the priority call;
identify a current call to be terminated and a time when the current call will be terminated, in response to determining that insufficient bandwidth exists for the priority call;
when the time for terminating the current call is reached, again determine whether sufficient bandwidth is available for the priority call and perform at least one of: terminate the current call and use the bandwidth from the terminated call for the priority call in response to determining that sufficient bandwidth continues to be unavailable for the priority call, or continue the current call and use the existing bandwidth for the priority call in response to determining that sufficient bandwidth now exists for the priority call; and
route the priority call to the routable destination number.

14. The system of claim 13 wherein the request for a priority call is a request for a priority call utilizing government emergency telecommunications services.

15. The system of claim 13 wherein the request for a priority call is a request for a priority call utilizing a wireless priority service.

16. The system of claim 13 wherein one or more of the network elements comprise a policy server for routing priority calls.

17. The system of claim 13 wherein one or more of the network elements comprise an authentication server for verifying identity of a caller and approving priority calls.

18. The system of claim 13 wherein one or more of the network elements comprise an application server for translating toll free numbers into routable destination numbers.

19. The system of claim 13 wherein one or more of the network elements comprise a session initiation protocol based server which routes a call with priority by setting a resource priority header.

20. The system of claim 13 further comprising a database for storing at least one of:
authentication data, number translation data, and call routing data.

21. The system of claim 13 wherein the one or more network elements are further configured to:
route the priority call through an alternative network when there is a need for bandwidth for the priority call.

* * * * *